(12) United States Patent
Machani

(10) Patent No.: US 9,344,896 B2
(45) Date of Patent: May 17, 2016

(54) METHOD AND SYSTEM FOR DELIVERING A COMMAND TO A MOBILE DEVICE

(75) Inventor: Salah E. Machani, Thornhill (CA)

(73) Assignee: IMS HEALTH INC., Danbury, CT (US)

( * ) Notice: Subject to any disclaimer, the term of this patent is extended or adjusted under 35 U.S.C. 154(b) by 498 days.

(21) Appl. No.: 12/500,979

(22) Filed: Jul. 10, 2009

(65) Prior Publication Data

US 2010/0291899 A1    Nov. 18, 2010

(30) Foreign Application Priority Data

May 12, 2009  (CA) .................................... 2665961

(51) Int. Cl.
*H04M 1/66* (2006.01)
*H04M 1/68* (2006.01)
*H04M 3/16* (2006.01)
*H04W 12/12* (2009.01)
*H04L 29/06* (2006.01)
*H04W 12/06* (2009.01)
*H04W 88/02* (2009.01)

(52) U.S. Cl.
CPC ........... *H04W 12/12* (2013.01); *H04L 63/0838* (2013.01); *H04W 12/06* (2013.01); *H04W 88/02* (2013.01)

(58) Field of Classification Search
CPC ... H04L 63/08; H04L 63/0838; H04L 9/3228; H04L 2209/80; H04L 9/0825; H04L 9/085; H04L 9/3226; H04L 9/3271; H04L 9/0861; H04L 9/0863; G06F 21/00; G06F 12/1408; G06F 12/1466; G06F 21/44
USPC .......... 455/410, 411, 418, 419, 420; 713/167, 713/168, 172, 183, 184
See application file for complete search history.

(56) References Cited

U.S. PATENT DOCUMENTS

| | | | | |
|---|---|---|---|---|
| 6,067,621 | A  * | 5/2000 | Yu et al. ......................... | 713/172 |
| 8,132,242 | B1 * | 3/2012 | Wu ..................... | H04L 63/0884 713/168 |
| 2003/0065934 | A1* | 4/2003 | Angelo et al. ................ | 713/200 |
| 2003/0202661 | A1* | 10/2003 | Rodriguez ........... | H04N 7/1675 380/239 |
| 2004/0224665 | A1* | 11/2004 | Kokubo ........................ | 455/411 |
| 2004/0267944 | A1* | 12/2004 | Britt, Jr. ........................ | 709/229 |
| 2005/0235148 | A1* | 10/2005 | Scheidt ................... | G06F 21/31 713/168 |
| 2007/0178881 | A1* | 8/2007 | Teunissen et al. ............ | 455/410 |
| 2009/0093235 | A1* | 4/2009 | Grealish et al. .............. | 455/411 |
| 2009/0249076 | A1* | 10/2009 | Reed et al. .................... | 713/181 |
| 2009/0265552 | A1* | 10/2009 | Moshir et al. ................. | 713/168 |
| 2010/0022239 | A1* | 1/2010 | Anzai ............................ | 455/434 |
| 2010/0122327 | A1* | 5/2010 | Linecker et al. .................. | 726/6 |
| 2010/0280946 | A1* | 11/2010 | Batten ............................. | 705/42 |

* cited by examiner

Primary Examiner — Allahyar Kasraian
(74) Attorney, Agent, or Firm — Maldjian Law Group LLC

(57) ABSTRACT

A method and system for delivering a command to a mobile device is provided. A one-time password is generated using a token shared with a mobile device and one of a challenge and an input string. The one-time password and a command are transmitted, along with the challenge or the input string, to the mobile device for execution thereon.

14 Claims, 4 Drawing Sheets

METHOD AND SYSTEM FOR DELIVERING A COMMAND TO A MOBILE DEVICE

FIELD OF THE INVENTION

The present invention relates to the field of security. In particular, it relates to a method and system for delivering a command to a mobile device.

BACKGROUND OF THE INVENTION

Mobile devices are assuming many roles. As the processing power and memory of mobile devices have increased, they have been able to handle more challenging applications. In addition, due to the high adoption rate and portability of mobile devices, they are becoming the one common element for people, who carry these devices with them everywhere. Such mobile devices are replacing the functionality of landline telephones, address books, personal organizers, personal computers, photo cameras, radios, etc. In some cases, such mobile devices are even replacing much of the functionality of wallets, and are being used as a means for carrying out banking.

For purposes of the discussion hereinbelow, mobile devices include mobile telephones, personal digital assistants, and other portable computing devices that have a network communications interface, and allow the execution of agents in the background or wake up agents/applications upon an event, such as receiving a message. Mobile devices include subscriber identity modules and other modules that can be plugged into them.

The expansion of the functionality of mobile devices into these new areas has placed new requirements on them. More information and, correspondingly, more sensitive information is being stored by such devices. An example of an application that places new demands on the mobile device is an electronic wallet ("e-wallet"). An e-wallet is a software application that, like a real wallet, stores credit card information, banking information, etc. together with shipping and other personal details. In addition, e-wallets can store credentials and other security elements for purposes of authenticating the user and/or service provider. E-wallets can act as plug-ins to browsers, making it possible for a credit card holder to conduct online banking and retail transactions, manage payment receipts and store digital certificates. In addition, e-wallets can also store personal data (such as health care and banking data), corporate data (such as client contact information, correspondence, etc.), and various security elements for accessing personal and corporate networks and other resources or services.

Given the sensitivity of the data and the security elements being stored on such mobile devices, it is highly desirable to maintain the security of such information on an ongoing basis. Access to certain functionality on the mobile devices can be password-protected. etc. to prevent casual access or hacking attempts where the mobile devices are not in the possession of their owners. As such casual hackers only have a limited period of time and means to attempt to access the information housed on a mobile device, such attacks generally do not pose strong security threats.

The loss or theft of a mobile device presents a different and significantly greater threat. Given permanent possession of a mobile device and the freedom to physically disassemble the device, a wide variety of stronger techniques can be used to hack the device to obtain access to the data and security elements stored thereon. As a result, this scenario poses a greater threat to the security of the data and security elements.

Further, as the mobile device is not physically accessible to the owner, he cannot carry out actions that would otherwise remove or make inaccessible the data and/or security elements from the memory of the mobile device.

Systems exist whereby the data and/or security elements on a mobile device can be erased or otherwise made inaccessible after a pre-set number of unsuccessful login attempts have been made. Such security mechanisms, however, rely on the integrity of the application and its normal mode of use on the mobile device. Given sufficient time, it may be possible to disable the security mechanisms of an application and/or the operating system upon which it executes. In a more direct approach, the physical memory of the mobile device may be accessed through unconventional methods or even removed and hacked, such as with brute-force attacks.

It is an object of this invention to provide a novel method and system for delivering a command to a mobile device.

SUMMARY OF THE INVENTION

In an aspect of the invention, there is provided a computerized method for delivering a command to a mobile device, comprising:
  generating a one-time password using a token shared with a mobile device and one of a challenge and an input string; and
  transmitting said one-time password and said one of said challenge and said input string, along with a command, to said mobile device.

The method can further include receiving a request to transmit a command to said mobile device prior to the generating.

The method can include receiving the one of the challenge and the input string.

The command can be a wipe data command. The wipe data command can specify that all or a subset of the data in a memory of the mobile device is to be erased.

The command can be a wipe security elements command that can specify that all or a subset of the security elements of the mobile device are to be erased.

The command can direct the mobile device to establish a data or a voice call.

Alternatively, the command can direct the mobile device to advance to a locked state.

The input string can be a random sequence number.

The transmitting can be performed independent of communications from said mobile device (i.e., via push).

The transmitting can be performed via short message service.

The token can be a soft token.

In another aspect of the invention, there is provided a system for delivering a command to a mobile device, comprising:
  a user database storing a plurality of tokens, each of said tokens being shared with a mobile device;
  an input interface for receiving a request to send a command to a mobile device;
  a one-time password generator for generating a one-time password using one of said tokens shared with said mobile device and one of a challenge and an input string; and
  a communications module for communicating said one-time password, said command and said one of said challenge and said input string to said mobile device.

The system can further include a software archive storing token agents for installation on mobile devices.

The said input interface can permit entry of the one of the challenge and the input string.

The tokens can be soft tokens.

The input interface can be provided by a web server.

The communications module can include a short message service server for communicating the command.

The user database can store login credentials and information regarding mobile devices registered to each user.

Other and further advantages and features of the invention will be apparent to those skilled in the art from the following detailed description thereof, taken in conjunction with the accompanying drawings.

BRIEF DESCRIPTION OF THE DRAWINGS

An embodiment will now be described, by way of example only, with reference to the attached Figures, wherein.

DETAILED DESCRIPTION OF THE EMBODIMENT

The invention relates to a method and system for delivering a command to a mobile device. By generating a one-time password using a token shared with the mobile device and one of a challenge or an input string provided by a user, a command transmitted to the mobile device can be authenticated and, thus trusted for execution.

Figure 1:
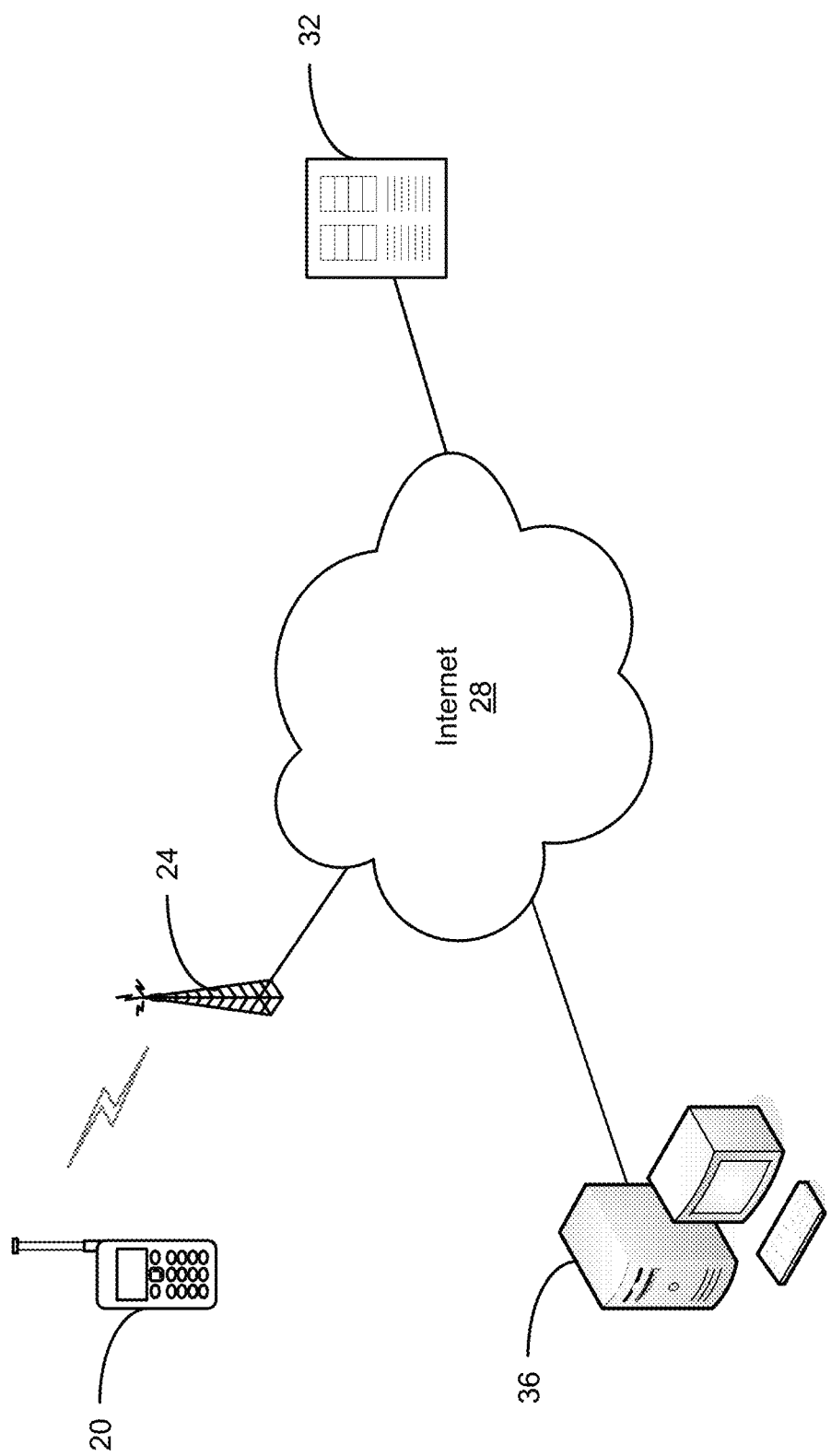
FIG. 1 is a schematic diagram of a system for delivering a command to a mobile device and its operating environment in accordance with an embodiment of the invention.

A system for delivering a command to a mobile device and its operating environment in accordance with an aspect of the invention is shown in FIG. 1. A mobile device 20 is in communication witlessly with a cellular base station 24 via cellular communications. The cellular base station 24 is in communication with a large, public network, such as the Internet 28, via a number of intermediate servers and switches that form pail of the infrastructure of a cellular communications provider (not shown).

The mobile device 20 stores various applications that manage sensitive data, such as, for example, an address book application, a calendar application, an email application, a browser application and an e-wallet application. Many such applications typically do not store data in a secure manner, such as in an encrypted format, nor for that matter do such applications generally require a password to be entered to access the data via the interface of the application. Some applications may require a password to be entered before access to certain data is provided. In addition, the mobile device 20 may store one or more applications that store security elements such as login credentials for various services, such as for banking. These credentials can be stored either in encrypted or unencrypted format in the memory of the mobile device 20. For example, an e-wallet application stores credit card, banking and other information, together with login credentials for sites and services.

A system 32 for delivering a command to a mobile device is also in communication with the Internet 28. The system 32 is a large server that performs a variety of functions to provide a service wherein commands can be issued to mobile devices registered with the service. The system 32 includes a web application that allows the system 32 to act as a web server. The web application enables users to register themselves and their mobile devices with the service. In addition, the web application provides an input interface with which users can interact to direct the system 32 to deliver commands sent to their registered mobile devices. Further, the system 32 includes a short message service ("SMS") server application for transmitting commands to mobile devices via SMS messages. Further, the system 32 maintains a user database in which the telephone numbers of mobile devices operated by users are registered, along with a login ID, a password and a soft token for each user. The system 32 also includes a software archive that stores software packages for installing a client on various mobile devices. Further, the system 32 maintains a user database that includes user and associated security elements and mobile device information.

Figure 2:
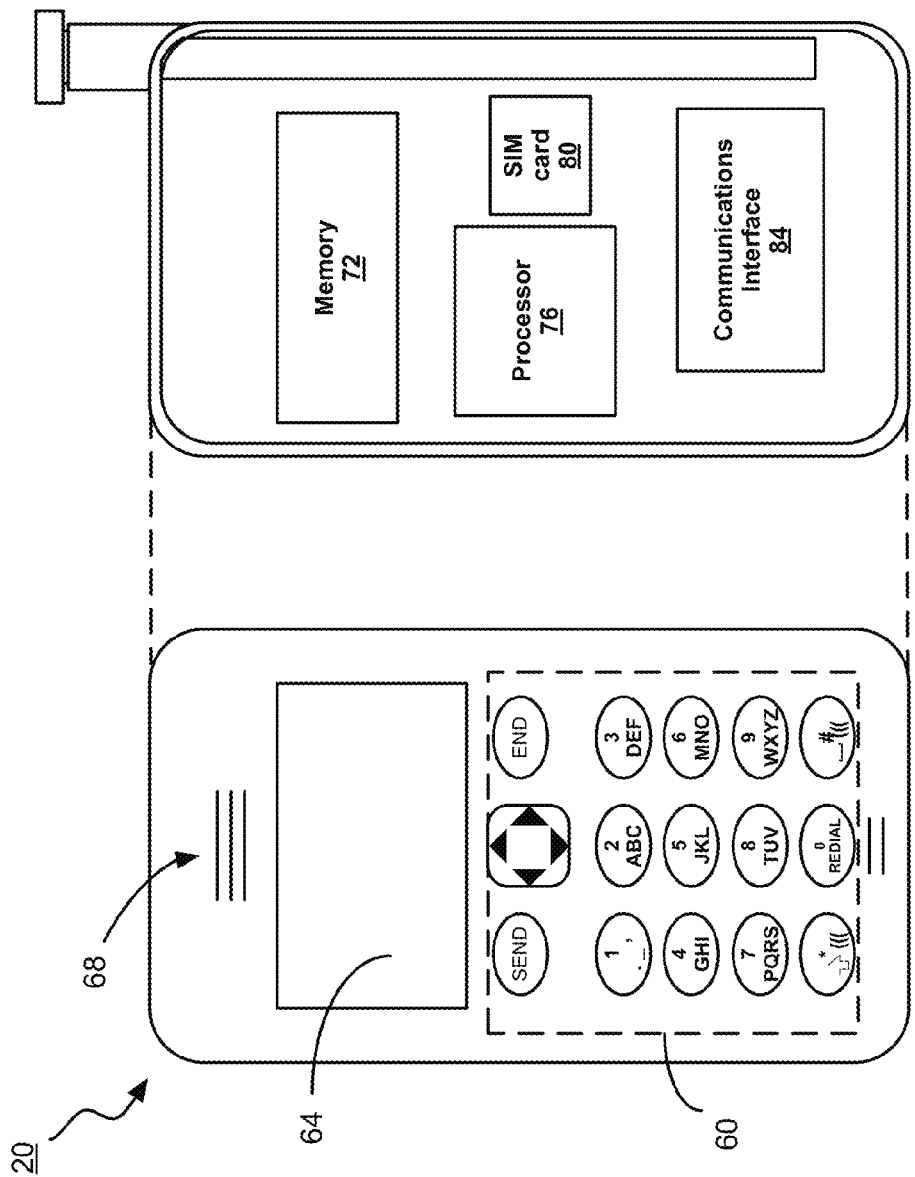
FIG. 2 is a schematic diagram of various logical components of the mobile device of FIG. 1.

Referring to FIG. 2, a number of components of the mobile device 20 are shown. As shown, the mobile device 20 is a typical GSM mobile phone having basic functions. The mobile device 20 has an input interface 60 for receiving input from a user. A display 64 is provided for presenting information visually to the user. A speaker 68 presents/provides audio information/signals. The mobile device 20 also includes memory 72 for storing an operating system that controls the main functionality of the mobile device 20, along with a number of applications that are run on the mobile device 20. A processor 76 executes the operating system and applications. A subscriber identification module ("SIM") card 80 stores applications and has a microprocessor for executing them-L Additionally, SIM card 80 has a unique hardware identification code that permits identification of the mobile device 20. A communications interface 84 permits communications with a cellular network using a protocol such as GPRS, 1XRTT, EDGED, HSDPA or another Internet Protocol-based data radio standard.

Referring back to FIG. 1, in order to use the service provided by the system 32, a user registers via a registration web page served by the web server executing on the system 32 using a personal computer 36 or any other computing device having a web browser application and that is connected to the Internet 28. During registration, the user provides the telephone number of the mobile device 20 that he would like to register with the service, along with login credentials to authenticate himself with the server 32 in the future when logging in. The user may, in fact, register the telephone number of more than one mobile device. Additionally, more than one user may register the same telephone number in certain circumstances; for example, a corporate user and a corporate IT administrator. The system 32 sends the mobile device, via the telephone number, an SMS message with a link to download software from the software archive. Upon receiving the SMS, selection and activation of the link on the mobile device 20 launches the mobile browser on the mobile device 20 and loads up a download page. The user selects his mobile device from a list presented on the download page and activation of the selection commences a download of a software package for installing a software ("soft") token agent on his mobile device 20. Upon completion of the download, the software package is automatically installed in the memory 72 of the mobile device 20. Further, the soft token agent contacts the system 32 to obtain a soft token that is used for generating one-time passwords ("OTPs"). A copy of the soft token is stored in the user database maintained by the system 32.

During installation of the soft token agent on the mobile device 20, the soft token agent is registered with the operating system, along with message types that are associated with the soft token agent. In particular, SMS messages having a particular identifier in the SMS message header are associated with the soft token agent. Upon receiving an SMS message that is associated with the soft token agent, a listener of the operating system parses the SMS message (namely, the SMS message header here) to categorize the SMS message and alerts the operating system that the SMS message was received. The operating system determines the appropriate handling application (i.e., the soft token agent, in this case) associated with the identifier in the header, and then starts up the soft token agent and passes it the SMS message.

Additionally, the soft token agent stores the soft token received from the system 32 and can generate one-time passwords using the soft token and one of a challenge and an input string. The input string can be any sequence of characters, such as a word or a random sequence number.

Figure 3:
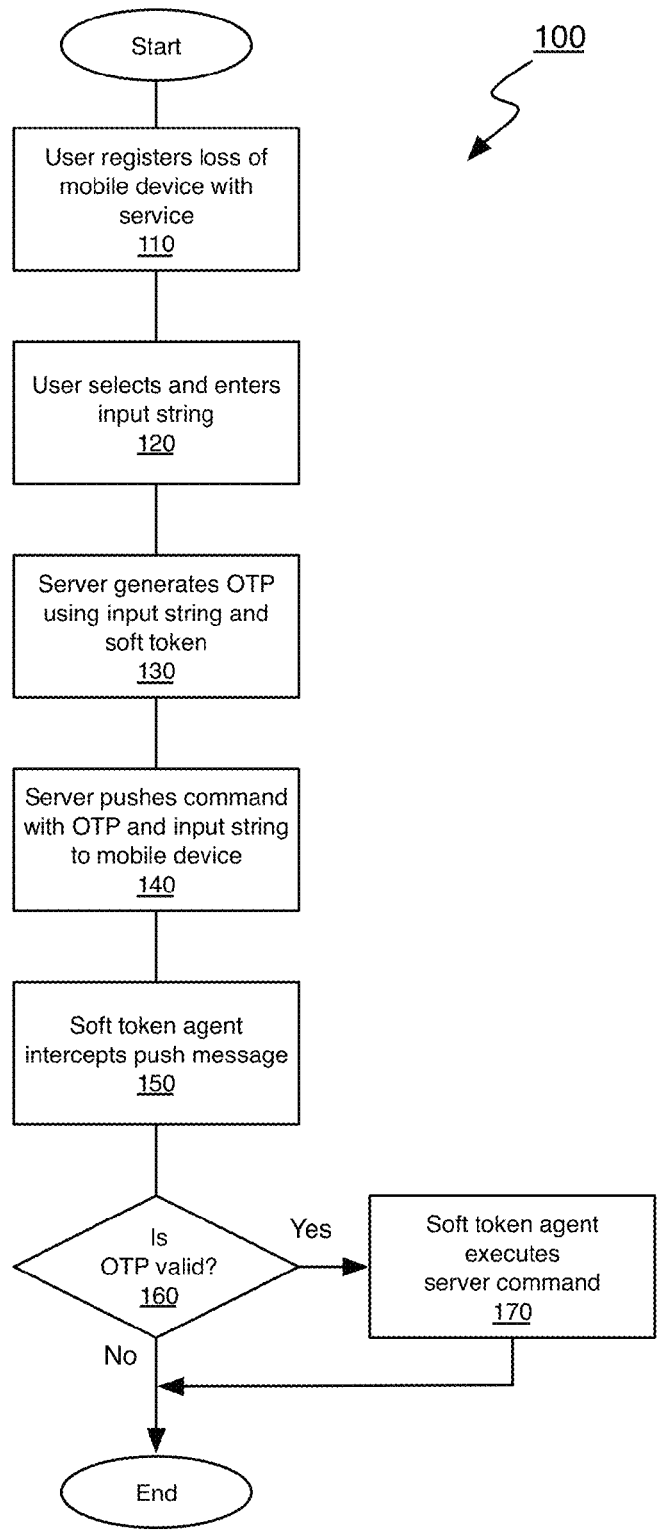
FIG. 3 is a flowchart of the general method used by the system of FIG. 1 for delivering a command to a mobile device.

FIG. 3 shows the method of delivering a command to a mobile device used by the system 32 generally at 100. When a registered user loses a mobile device, either through misplacement or theft, he registers the loss of the mobile device with the service (step 110). The user logs onto a web page of the service run by the system 32, via the personal computer 36 for example, using the login credentials provided during registration. The user is then presented with a page that enables him to click on a link to a page if his mobile device was lost or stolen. At the next page, the user is directed to re-enter his login credentials if he would like the data on his mobile device wiped.

The user is then taken to a web page wherein lie is asked to select and enter an input string (step 120). Upon entering the input string, the system 32 retrieves the soft token from the user database and generates an OTP using the soft token shared with the mobile device and the input string (step 130). The system 32 then transmits the "wipe data" command, along with the OTP and the input string, to the mobile device 20 (step 140). The command, the OTP and the input string are sent via an SMS message that includes an identifier in the header, which indicates that the SMS message includes a command.

Once received by the mobile device 20, the operating system intercepts the message, via the listener, and awakens the soft token agent, before passing the message to it (step 150). The soft token agent then determines if the OTP contained in the SMS message is valid (step 160).

Figure 4:
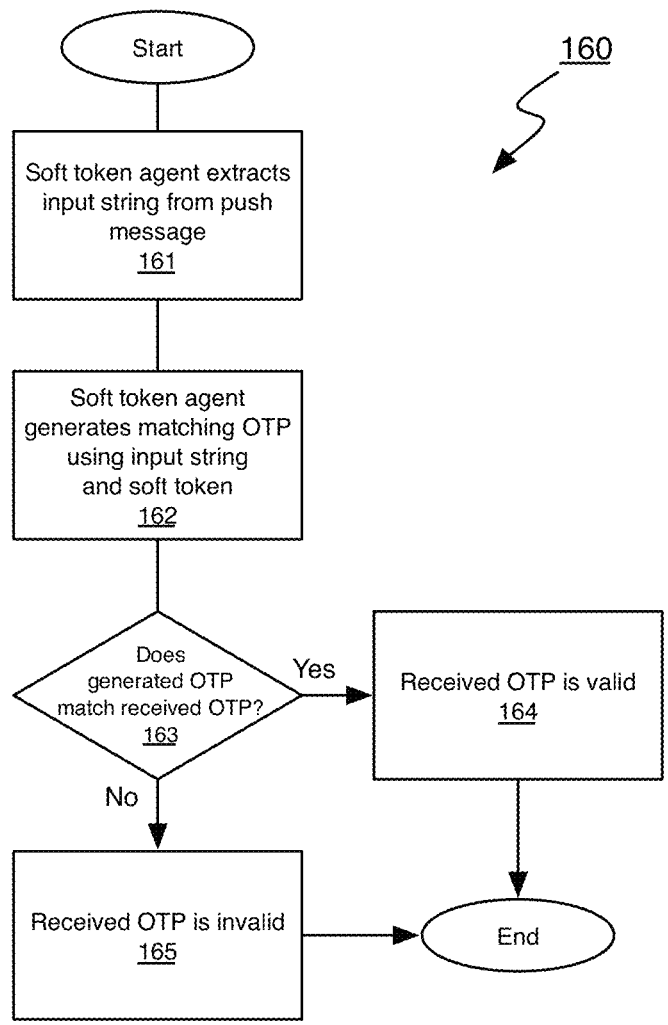
FIG. 4 shows the steps performed during the determination of the validity of the one-time password by the mobile device upon receiving it from the system.

FIG. 4 illustrates the process of validating the OTP in greater detail. The soft token agent extracts the "wipe data" command, along with the OTP and the input string, from the message body of the SMS message (step 161). Alternatively, the OTP and/or command can be placed in the SMS message header. Using the input string and the soft key stored in memory of the mobile device 20, the soft token agent then generates an OTP (step 162). The soft token agent then determines if the OTP that it generated matches the one received from the system 32 (step 163). If the OTP that it generated matches the one received from the system 32, the OTP received from the system 32 is deemed valid (step 164). If, instead, the OTP that the soft token agent generated does not match the OTP received from the system 32, the OTP received from the system 32 is deemed invalid (step 165).

Returning to FIG. 3, if the OTP received from the system 32 is deemed valid at step 160, the soft token agent executes the command extracted from the SMS message (step 170). At this point, the soft token agent wipes the data and security elements from the memory of the mobile device 20. If, instead, the OTP received from the system 32 is deemed to be invalid at step 160, nothing further is done.

While the embodiment of the invention has been described with reference to soft tokens, those of skill in the art will appreciate that other forms of tokens can be used without deviating from the spirit of the invention.

Other methods of delivering a command to a mobile device apart from SMS can be employed. For example, other methods (i.e., methods wherein the command is transmitted independent of communications from the mobile device) such as, for example, MMS, EMS, WAP push, email, etc. can be employed.

Other methods of generating one-time passwords can be employed. For example, more than one input string and challenge can be used in combination.

Various types of challenge-responses can be employed. For example, during registration and/or installation of the soft token agent on the mobile device, information about the mobile device can be collected by the system and subsequently used for generating challenge-responses. In this example, challenges may include hardware identifiers, versions of the operating system and/or an application, etc. Using this collected information, the system can select one known and shared challenge-response pair, generate an OTP using the selected response and the shared soft token, then forward the OTP and the corresponding challenge to the mobile device along with the command to enable authentication of the command issuer.

It can be desirable to issue other commands for execution by the mobile device. For example, it may be desirable to only wipe certain data and/or security elements on the mobile device, such as data maintained by a particular application or data flagged in a certain manner. The mobile device can be directed to establish a data or voice call to the system, perhaps enabling geolocation of the mobile device. Additionally, the mobile device, or one or more applications stored thereon, can be directed to advance to a locked state. The command can direct the mobile device to display an alert or start up an application.

The system that executes the method can be a single physical computer, a number of computers coupled together locally to provide the desired functionality or a number of distributed computers that perform the same functionality.

The token agent can be installed on the mobile device in other ways, such as via a data cable connected to a personal computer, via WiFi, or via loading of the token agent on a SIM.

The above-described embodiments are intended to be examples of the present invention and alterations and modifications may be effected thereto, by those of skill in the art, without departing from the scope of the invention which is defined solely by the claims appended hereto.

What is claimed is:

1. A computerized method for delivering a command to a mobile device, comprising:
    providing in advance a soft token agent to said mobile device, wherein the soft token agent is executable on said mobile device to determine if a one-time password is valid;
    receiving a request to transmit said command to said mobile device;
    receiving, from a computing device independent of the mobile device, one of a challenge and an input string;
    generating a one-time password using a token shared with said mobile device and one of said challenge and said input string; and
    transmitting said one-time password and one of said challenge and said input string, along with said command, in a single communication to said mobile device, for determination of validity in said mobile device by the soft token agent of the transmitted one-time password;
wherein said transmitting is performed independent of communications from said mobile device.

2. The method of claim 1, wherein said command is a wipe data command.

3. The method of claim 2, wherein said wipe data command specifies that all data in a memory of said mobile device is to be erased.

4. The method of claim 2, wherein said wipe data command specifies a subset of data on said mobile device is to be erased.

5. The method of claim 1, wherein said command is a wipe security elements command.

6. The method of claim 5, wherein said wipe security elements command specifies a subset of security elements on said mobile device to be erased.

7. The method of claim 1, wherein said command directs said mobile device to establish a call.

8. The method of claim 7, wherein said call is a data call.

9. The method of claim 7, wherein said call is a voice call.

10. The method of claim 1, wherein said command directs said mobile device to advance to a locked state.

11. The method of claim 1, wherein said command directs said mobile device to advance an application to a locked state.

12. The method of claim 1, wherein said transmitting comprises transmitting via short message service.

13. The method of claim 1, wherein said token is a soft token.

14. The method of claim 1, wherein said input string is a random sequence number.

* * * * *